United States Patent [19]

Kurita

[11] Patent Number: 5,215,330
[45] Date of Patent: Jun. 1, 1993

[54] PAD FOR AIR BAG DEVICE
[75] Inventor: Kenji Kurita, Fujisawa, Japan
[73] Assignee: NSK Ltd., Tokyo, Japan
[21] Appl. No.: 733,150
[22] Filed: Jul. 30, 1991
[30] Foreign Application Priority Data Aug. 2, 1990 [JP] Japan .................................. 81667[U]

[51] Int. Cl.⁵ .............................................. B60R 21/16
[52] U.S. Cl. .................................................... 280/728
[58] Field of Search ................ 280/728, 743, 731, 732

[56] References Cited

U.S. PATENT DOCUMENTS

| 4,400,010 | 8/1983 | Stutz et al. |
| 4,752,083 | 6/1988 | Honda |
| 4,810,005 | 3/1989 | Föhl |
| 4,852,907 | 8/1989 | Shiraki et al. |
| 4,911,471 | 3/1990 | Hirabayashi |
| 5,069,477 | 12/1991 | Shiraki ................................ 280/743 |

FOREIGN PATENT DOCUMENTS

| 3545028 | 7/1987 | Fed. Rep. of Germany ...... 280/743 |
| 127336 | 10/1975 | Japan . |
| 110643 | 8/1980 | Japan . |
| 155869 | 10/1988 | Japan . |
| 192159 | 12/1988 | Japan . |
| 42959 | 3/1989 | Japan . |
| 0122753 | 5/1989 | Japan ................................ 280/743 |
| 123566 | 8/1989 | Japan . |
| 301461 | 12/1989 | Japan . |

Primary Examiner—Margaret A. Focarino
Assistant Examiner—Paul Dickson
Attorney, Agent, or Firm—Wegner, Cantor, Mueller & Player

[57] ABSTRACT

Described is a pad for an air bag device. The pad has an embedded, plate-like element, which is composed of at least two plate-like members. An edge portion of one of the plate-like members overlaps the other plate-like member.

8 Claims, 4 Drawing Sheets

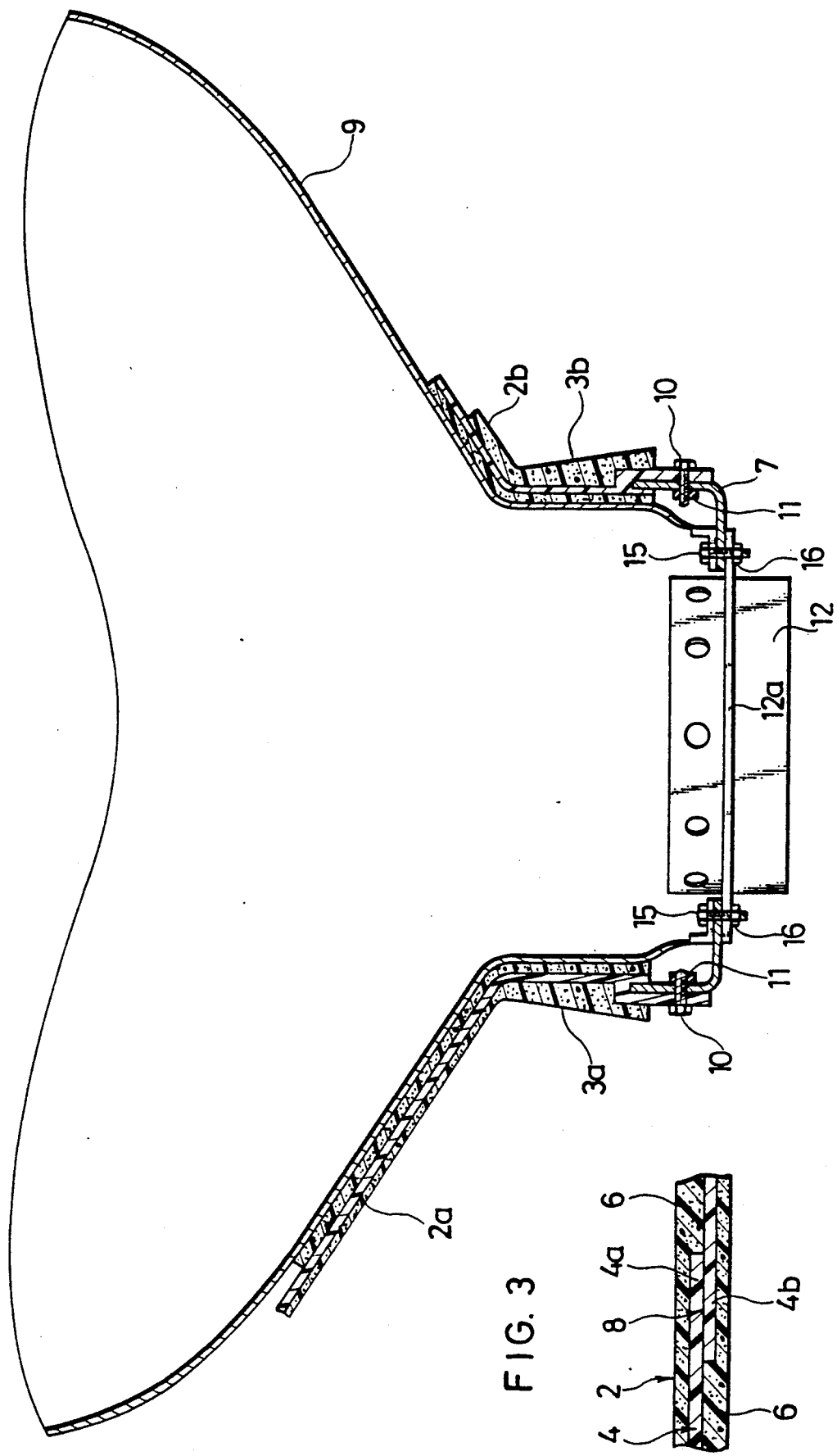

PAD FOR AIR BAG DEVICE

BACKGROUND OF THE INVENTION

1) Field of the Invention

This invention relates to a pad for an air bag device, said pad normally covering and storing an air bag which is to be inflated under a predetermined situation to protect an occupant of an automotive vehicle or the like.

2) Description of the Related Art

As an impact-reducing device for supporting a seat belt system provided to safely restrain an occupant or a vehicle or the like in a seat, air bag devices have been put into practical use in recent years. According to these air bag devices, the occupant's body, especially his head and chest, are supported by a balloon-like air bag in the event of a collision, followed by the gradual release of the internal gas, so that the impact-reducing stroke can be prolonged to lower an impact to be applied to the occupant's body.

Such an air bag device comprises a folded air bag and an inflator (gas generator), for example, both stored inside a center pad of a steering wheel. The inflator is ignited by an electrical signal from a sensor which detects a collision of the vehicle, whereby the air bag is instantaneously caused to expand by combustion gas so ignited. A top wall of the center bad must therefore be severed and opened by the expanding pressure of the air bag, so that the air bag can be inflated out through the severed opening to a substantial extent above the center pad.

As is disclosed in Japanese Patent Application Laid-Open (Kokai) Nos. SHO 50-127336, SHO 55-110643 and HEI 1-204838 and Japanese Utility Model Application Laid-Open (Kokai) Nos. SHO 63-155869, SHO 63-192159, SHO 63-251353, SHO 64-42959 and HEI 1-123566, a pad of the above sort is formed of a soft synthetic resin such as a polyurethane so that, when its associated air bag expands, it can be severed by the expanding pressure. In addition, it has a severable, thin-walled portion, for example, having a substantially H shape as viewed from the top so that a top wall of the pad can be severed into sections of the substantially the same size.

Moreover, it is desirable to make the top wall of the thin-walled portion as thin as possible so that the top wall can be easily severed into sections of the substantially the same size upon expansion of the air bag. The thickness of the thin-walled portion is therefore set at approximately 1.0–0.5 mm as opposed to a thickness of about 4.0–7.0 mm for the thickness of the remaining portion.

Further, to prevent the pad of the above type from being broken up into small pieces and spreading around upon inflation of the air bag, a net-like insert made of flexible, synthetic fibers such as polyamide fibers is embedded.

When a pad with such a net-like insert embedded therein is formed by injection molding, it is difficult and cumbersome to set the net-like insert inside a mold because the net-like insert is made of a flexible material. Further, when a pad having a thin-walled portion is formed by injection molding, short molding tends to occur at the thin-walled portion. This has led to the problem that a high percentage of products molded as described above are defective and the productivity of such pads is not good.

Formation of the thin-walled portion in an unduly small thickness however results in the potential problem that the pad may be severed when the air bag is not inflated, namely, when its severing is not needed, for example, when the pad is pressed by a hand or the like.

SUMMARY OF THE INVENTION

An object of the present invention is therefore to overcome the above problems and to provide a pad for an air bag device, which pad, without impairing the ease of severing it upon inflation of the air bag, has high productivity and yet is free from accidental severance.

The above object of the present invention can be achieved by a pad for an air bag device, said pad being formed such that said pad can normally cover an air bag—which is to be inflated under a predetermined situation—but can be severed at a predetermined portion to be opened upon expansion of the air bag, comprising a plate-like element embedded as a reinforcement in the pad and composed of at least two plate-like members, an edge portion of one of said plate-like members overlapping the other plate-like member.

According to the present invention, the reinforcement for the pad is formed of the plate-like element having higher stiffness than the conventional net-like insert so that the molding of the pad can be facilitated. Since the edge portion of one of the plate-like members is supported by the other plate-like member, a top wall of the pad is resistant to severance by external pressing force but is highly severable by internal stress which may be produced by the expanding force of the air bag.

BRIEF DESCRIPTION OF THE DRAWINGS

The above and other objects, features and advantages of the present invention will become apparent from the following description and the appended claims, taken in conjunction with the accompanying drawings, in which:

FIG. 3 is an enlarged, fragmentary, cross-sectional view of the pad depicted in FIG. 1;

FIG. 4 is a simplified, schematic, cross-sectional view showing the air bag device of FIG. 2 in an actuated state;

DETAILED DESCRIPTION OF THE INVENTION AND PREFERRED EMBODIMENTS

Figure 1:
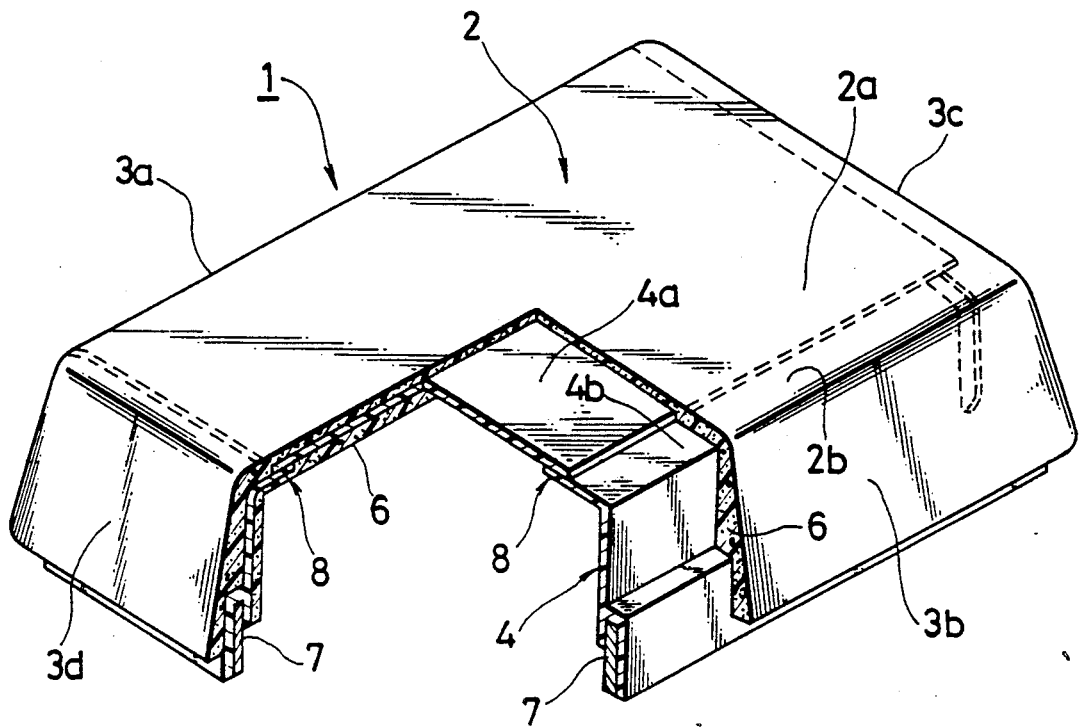
FIG. 1 is a partly cross-sectional, perspective view of a pad for an air bag device, according to a first embodiment of the present invention.
Figure 2:
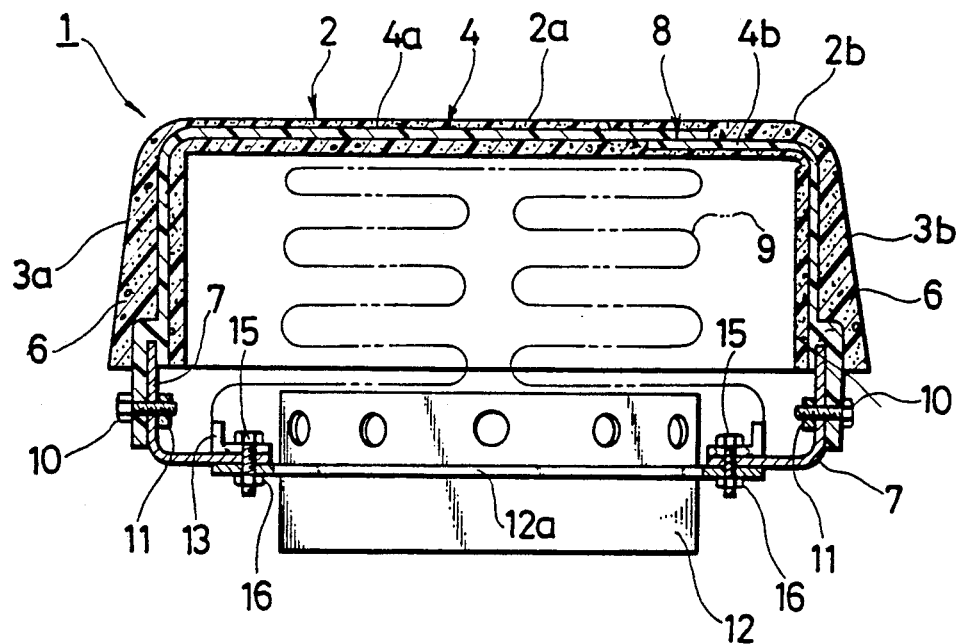
FIG. 2 is a simplified, schematic, cross-sectional view of an air bag device equipped with the pad shown in FIG. 1.

Referring now to FIGS. 1 through 4, the pad according to the first embodiment of the present invention will be described in detail.

The pad of the air bag device, which is generally designated at numeral 1, is arranged such that the pad 1 covers an air bag 9 above a hub portion of a steering wheel. The pad 1 is formed in substantially box-like shape and has a top wall 2 of a substantially-rectangular shape as viewed from the top and four side walls 3a,3b,3c,3d extending downwardly from a peripheral edge of the top wall 2. The pad 1 is formed of a covering layer 6 of a soft, synthetic resin such as a polyurethane, which has been injection molded with a core 4 embedded therein.

The core 4 is a plate-like member formed of a hard or semi-hard, synthetic resin having shape retainability, such as a polyamide, vinyl chloride or polyolefin resin, or a metal such as a sheet metal, and is composed of a rectangular ring portion corresponding to the side walls 3a,3b,3c, 3d and top plate portions 4a,4b extending out from the rectangular ring portion and along the top wall 2. The top plate portion 4a extends out from a side of the side wall 3a and extends along a large part of the top wall 2, said large part including a central part of the top wall 2, whereas the top plate portion 4b extends out from a side of the side wall 3b and extends along a small part of the top wall 2. These top plate portions 4a,4b are formed such that they can be opened while being maintained in continuation with the rectangular ring portion on the side of the side wall 3a and the side wall 3b, respectively. The rectangular ring portion defines in a lower part thereof a flange or skirt and a slot, both employed to secure the pad 1 on a backup plate 7.

The backup plate 7, on which the lower part of the rectangular ring portion of the core 4 is fixed by bolts 10 and nuts 11 to hold the pad 1 in place, defines a central opening in which an inflator 12 is to be provided. The inflator 12 is upwardly inserted in the opening and a flange portion 12a of the inflator 12 is fixed to a peripheral edge of the opening of the backup plate 7 by means of bolts 15 and nuts 16 together with a circular fastening plate 13 fixed on a lower part of the air bag 9.

The top wall portion 4a of the core 4 in the pad 1 overlaps, at a free edge portion thereof, an upper surface of a proximal edge portion of the top wall portion 4b of the core 4, whereby the core 4 has an overlapped portion 8 (see FIG. 3). In other words, the free edge portion of the top plate portion 4a lies on the upper surface of the proximal edge portion of the top wall portion 4b so that the overlapped portion 8 is resistant to severance even when the top wall 2 of the pad 1 is pressed at the central part thereof from the outside of the pad. It is hence possible to prevent accidental severance of the pad 1 at a time other than the time of inflation of the air bag 9, for example, when the pad 1 is pressed by a hand or the like, even when the covering layer 6 of the pad 1 is formed with a thickness smaller than that of conventional pads.

When the air bag 9 covered by the pad 1 is caused to expand by gas generated from the inflator 12, the top wall 2 is severed along the overlapped portion 8 of the core 8 so that the top wall 2 is opened as severed sections 2a,2b as shown in FIG. 4. As a result, the air bag 9 is allowed to expand to a substantial extent above the hub portion. The severance of the top wall 2 into the severed sections 2a,2b takes place easily, because the covering layer 6 of the pad 1 is formed thinner than those in conventional pads and, when further stress is applied onto the central part of the upper wall 2 of the pad 1 from the inside of the pad 1 due to the expanding force of the air bag 2, force is applied to the overlapped portion 8 in such a direction as to separate the top wall portions 4a and 4b from each other. The top wall 2 of the pad 1 is therefore surely severed along the overlapped portion 8 of the core 4 without the need for advance formation of a thin-walled portion in an inner surface of the top wall portion 2.

Since the core 4 is embedded in the top wall 2, the top wall 2 is not broken up into small flying pieces when the air bag is inflated.

In the pad 1 of the construction as described above, it is unnecessary to provide a thin-walled portion to sever up the upper wall 2 into the severed sections 2a,2b. When the pad 1 is formed by injection molding, the above construction makes it possible to obviate the potential problem of short molding at such a thin-walled portion and, in addition, to increase the freedom in designing the pad and also to permit the use of a simpler mold. Since the core 4 embedded in the pad in place of a net-like insert is formed of a plate-like member having shape retainability, its setting inside a mold is easy so that the molding work is facilitated. This hence contributes to a reduction in the percent defective of molded products and hence to an improvement in the productivity of such pads.

Figure 5:
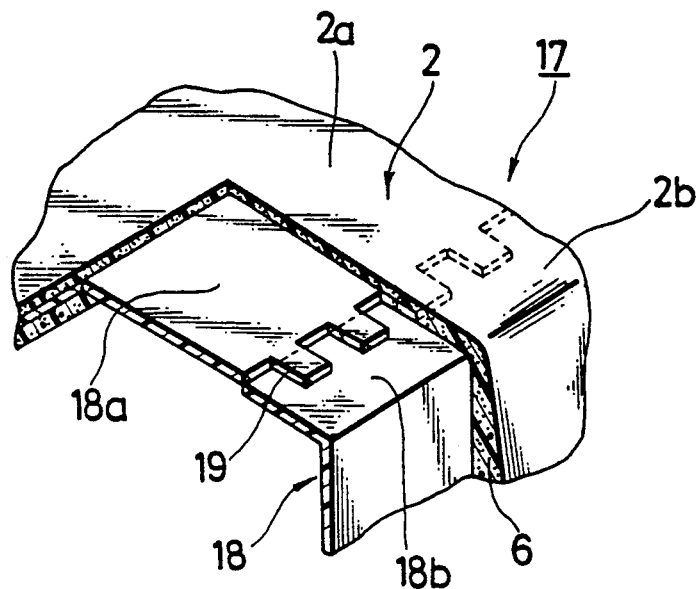
FIG. 5 is an enlarged, fragmentary, perspective view of a pad for an air bag device, according to a second embodiment of the present invention.

Incidentally, the free edge portion of the top plate portion 4a overlaps, over the entire length thereof, the top surface of the proximal edge portion of the other top late portion 4b in the first embodiment described above. It is however to be noted that the present invention is not limited to this construction. For example, like a pad 17 according to the second embodiment depicted in FIG. 5, it is possible to construct a core 18 in such a way that the core 18 has top plate portions 18a,18b similar to the top plate portions 4a,4b, serrations 19 are formed at predetermined intervals in the free edge portion of the top wall portion 18a and the serrations 19 lie on an upper surface of a proximal edge portion of the top wall portion 18b.

Figure 6:
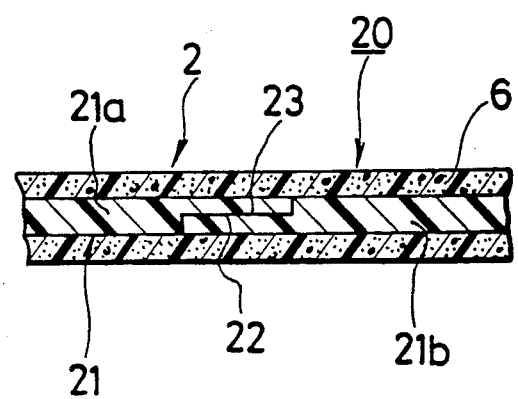
FIG. 6 is an enlarged, fragmentary, cross-sectional view of a pad for an air bag device, according to a third embodiment of the present invention.

As a further alternative, like a pad 20 according to the third embodiment illustrated in FIG. 6, it is also possible to construct a core 21 in such a way that the core 21 has top plate portions 21a,21b similar to the top plate portions 4a,4b, complementary stepped portions 22,23 having approximately a half thickness of the core 21 are formed in a free edge portion of the top wall portion 21a and in a proximal edge portion of the top wall portion 21b , respectively, and the stepped portions 22,23 are brought into engagement to support the free edge portion of the top plate portion 31a by the proximal edge portion of the top plate portion 31b. This construction makes it possible to prevent the core 21 from becoming thicker at the overlapped portion of the top plate portions 21a and 21b than at the remaining portion of the core 21, so that the pad 20 can be formed thinner.

Figure 7:
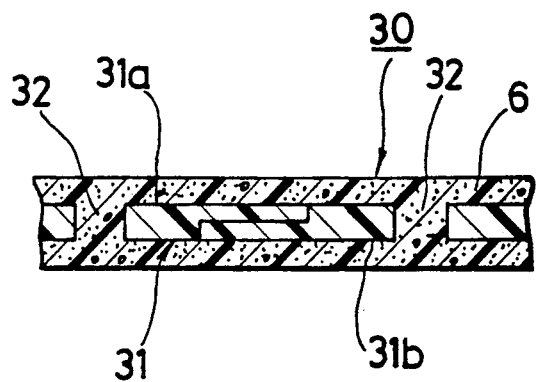
FIG. 7 is an enlarged, fragmentary, cross-sectional view of a pad for an air bag device, according to a fourth embodiment of the present invention.

The core according to the fourth embodiment of the present invention is indicated generally at numeral 30 in FIG. 7. In the fourth embodiment, a core 31 embedded in the pad 30 has top plate portions 31a,31b similar to the top plate portions 4a,4b, and through-holes 32 are formed in both the top plate portions 31a,31b. Owing to the provision of these through-holes 32, the bonding between the covering layer 6 and the core 31 has been enhanced further. Further, these through-holes 32 also serve to facilitate flow of a resin, which forms the covering layer 6, when the core 31 is covered by the covering layer 6. Similar effects can be brought about when such through-holes are formed in the core 31 at a portion other than the top plate portions 31a, 31b.

Figure 8:
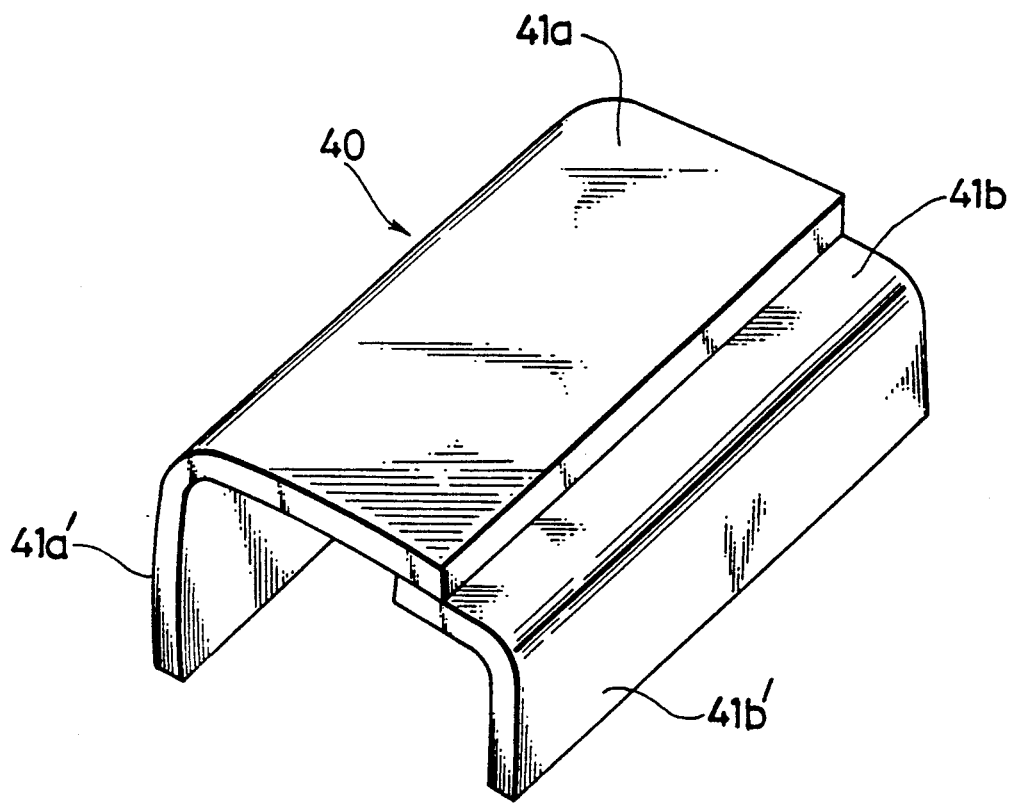
FIG. 8 is a perspective view of a core suitable for use in a pad according to a fifth embodiment of the present invention, which pad is in turn useful for an air bag device.

Reference is finally made to FIG. 8, in which the core suitable for use in the pad according to the fifth embodiment of the present invention is designated generally at numeral 40. The core 40 is composed of a first plate-like member having a top plate portion 41a and a second plate-like member having a top plate portion 41b. The top plate portions 41a, 41b are secured to the backup plate 7 (see FIG. 1) at base portions 41a', 41b', respectively. A pad with the core 40 functions in a similar manner to the pad 1 according to the first embodiment. In the fifth embodiment, the core 40 does not include plate-like members corresponding to the side walls 3c, 3d in the first embodiment, so that the production of the core 40 is facilitated.

In each of the first to fifth embodiments described above, the pad was described assuming that the pad would be arranged to cover an air bag above a hub portion of a steering wheel. It is to be noted that the present invention is not limited to such an arrangement. Needless to say, the present invention can be applied similarly to a pad which is to be arranged to cover an air bag provided inside a dash board on the side of a front passenger's seat. Similarly, the shape of a pad, the shape and number of severed sections of a top wall, etc. are not limited to the embodiments described above and can be modified in various ways.

According to the present invention, a reinforcement for a pad is formed of a plate-like member having higher stiffness than a conventional net-like insert so that the molding of the pad is facilitated. A free end portion of one of top plate portions, said one top plate portion extending along a top central part of the pad, is supported on another one of the top plate portions, so that the upper central portion of the pad is resistant to severance by pressing force from the outside of the pad but is easily severable by stress which may be produced from the inside of the pad by expanding force of an associated air bag. The pad can therefore be formed thinner than conventional pads. Further, it is unnecessary to provide a thin-walled portion which would otherwise be required to sever up the upper wall of the pad into sections of substantially the same size. Upon formation of the pad by injection molding, there is no possibility of occurrence of short molding at the thin-walled portion. As a result, the percent defective of molded products is reduced, the freedom in designing a pad is increased, and a simpler mold can be used.

The present invention can therefore provide an economical, high-productivity pad for an air bag device without impairing the ease in severing the pad upon inflation of the air bag.

I claim:

1. A pad for an air bag device, said pad being formed such that said pad can normally cover an air bag which is to be inflated under a predetermined situation and is severed at a predetermined portion to be opened upon expansion of the air bag, comprising:

a plate-shaped member embedded in the pad and composed of at least two plate portions, an edge portion of one of said plate portions overlapping only a proximal edge portion of the other plate portion, the overlap defining the predetermined portion to be severed.

2. The pad of claim 1, wherein the pad is formed in a substantially cup shape having a top wall and a side wall which extends downwardly from a peripheral edge of the top wall.

3. The pad of claim 2, wherein said one plate portion is formed to cover a central part of the top wall of the pad and said the other plate portion underlies said one plate portion.

4. The pad of claim 1, wherein serrations are formed in the edge portion of said one plate portion and overlap said the other plate portion.

5. The pad of claim 1, wherein a stepped portion is formed in the edge portion of said one plate portion, a complementary stepped portion is formed in said the other plate portion, and both the stepped portions overlap each other.

6. The pad of claim 1, wherein both of the plate portions define through-holes therein.

7. A pad for an air bag device, said pad being formed such that said pad can normally cover an air bag which is to be inflated under a predetermined situation and is severed at a predetermined portion to be opened upon expansion of the air bag, comprising:

a plate-shaped member embedded in the pad and composed of at least two plate portions, an edge portion of one of said plate portions overlapping the other plate portion, wherein serrations are formed in the edge portion of said one plate portion and overlap said the other plate portion.

8. A pad for an air bag device, said pad being formed such that said pad can normally cover an air bag which is to be inflated under a predetermined situation and is severed at a predetermined portion to be opened upon expansion of the air bag, comprising:

a plate-shaped member embedded in the pad and composed of at least two plate portions, an edge portion of one of said plate portions overlapping the other plate portion, wherein a stepped portion is formed in the edge portion of said one plate portion, a complementary stepped portion is formed in said the other plate portion, and both of the stepped portions overlap each other.

* * * * *